Jan. 6, 1942.  R. C. COLEMAN  2,268,697
FUEL TANK
Filed March 6, 1939

INVENTOR
Rolla C. Coleman.
BY
ATTORNEY

Patented Jan. 6, 1942

2,268,697

UNITED STATES PATENT OFFICE 2,268,697

FUEL TANK

Rolla C. Coleman, Kansas City, Mo., assignor to American Safety Tank Co., Kansas City, Mo., a corporation of Missouri Application March 6, 1939, Serial No. 259,998

1 Claim. (Cl. 220—86)

This invention relates to fuel tanks for motor vehicles, particularly those containing combustible and expansible fluids.

It is well known that filling station attendants are over zealous in filling the fuel tank of a motor vehicle as it is to their advantage to make as large a sale as possible, therefore, unless the owner is observant in filling of the tank, the tank is filled to the point where it is ready to flow from the filling spout. This practice is extremely hazardous for the reason that the fuel expands and spurts through the vent opening of the tank. This fuel is not only wasted but is apt to be ignited by the motor exhaust, or when the vehicle is parked through accidental ignition of the puddle of fuel collecting under the vehicle.

Also in case of accidents resulting in upset of the vehicle, the excess fuel is discharged from the filling spout and is apt to cause an additional hazard even though the tank is provided with a safety filling spout of the type disclosed in the Albert E. Haas and George H. Clay Patent No. 2,090,197, dated August 17, 1937.

It is, therefore, a principal purpose of the present invention to provide a fuel tank for a motor vehicle or the like that is equipped with safety means which automatically maintains an expansion space above the fuel even though the tank has been initially filled to the overflow point.

It is a further object of the invention to provide a tank equipped with a safety filling duct as disclosed in the above mentioned patent, together with safety means acting in conjunction therewith for maintaining sufficient expansion space to prevent discharge of the fuel even though the tank is initially filled to its maximum.

In accomplishing these and other objects of the invention, I have provided improved details of structure, the preferred form of which is illustrated in the accompanying drawing, wherein.

Figure 1:
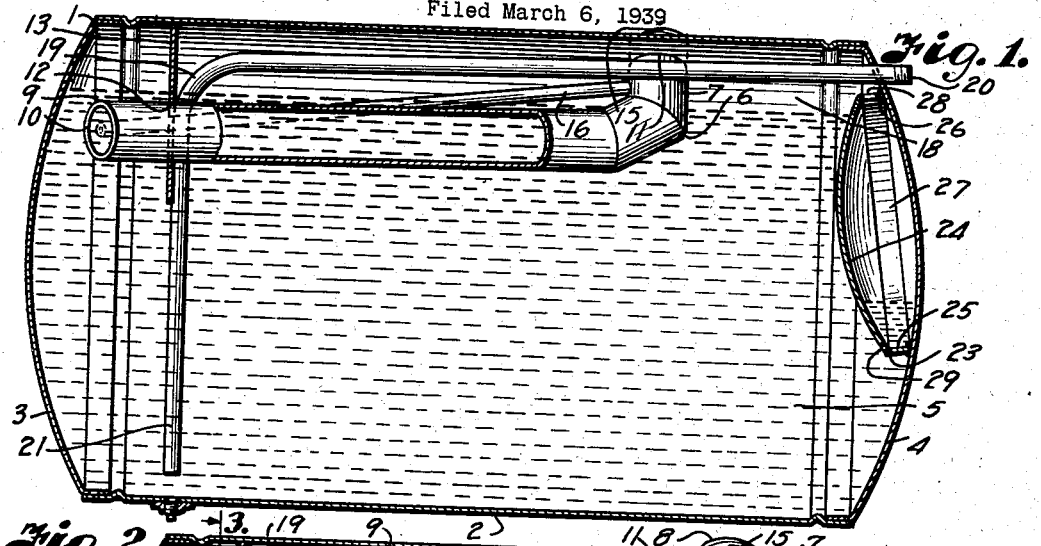
Fig. 1 is a vertical section through a fuel tank embodying the features of the present invention and showing the tank filled to the point where the fuel backflows from the filling duct.

Referring more in detail to the drawing:

1 designates a fuel tank for motor vehicles, boats, trucks, tractors, busses, motor trains or like conveyances, which is usually supported with its axis extending horizontally and transversely of the vehicle. The tank may be of any shape but is here illustrated as including a cylindrical wall 2, having outwardly crowned heads 3 and 4 welded or otherwise attached to the ends of the wall 2 to form a liquid-tight compartment 5 for the fuel.

The tank 1 has a filling duct 6 including a leg portion 7 extending laterally through the upper portion of the wall 2 adjacent one end thereof to form a fill opening 8 and a leg portion 9 extending substantially horizontally and in a diagonal direction to the opposite end of the tank to form an outlet opening 10 through which a fuel admitted through the inlet 8 flows into the compartment 5.

The duct thus described is rigidly supported in the tank by welding or otherwise sealing the leg portion 7 within the opening 11 of the wall 2 and the free end of the leg portion 9 extends through an opening 12 in a bracket plate 13 welded to the wall 2 at a point adjacent the head 3. The duct is so mounted in the tank that when the tank is in horizontal position the leg portion 9 of the duct slopes slightly toward the outlet end thereof to assure complete drainage of the duct and assist in rapid movement of the fuel therethrough when the tank is being filled. The end of the leg portion 7 that projects from the tank is provided with a screw thread or other attaching means 15 by which a closure cap is secured thereto.

Figure 3:
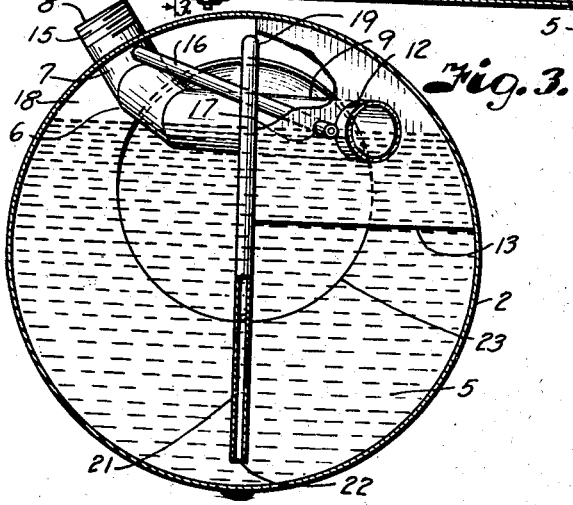
Fig. 3 is a cross-section on the line 3—3 of Fig. 2, a part of the filling duct supporting bracket being broken away.
Figure 4:
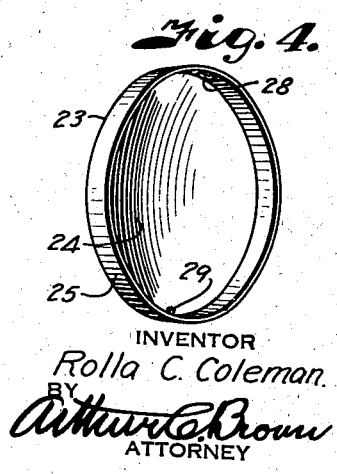
Fig. 4 is a detail perspective view of the fuel displacing member.

Cooperating with the filling duct is a vent pipe 16 having one end connected with the leg portion 7 at a point adjacent the wall 2 and which slopes downwardly and diagonally to extend through an opening 17 in the bracket 13 and terminate adjacent the outlet 10 of the filling duct, as clearly shown in Fig. 3.

Attention is directed to the fact that the outlet ends of the filling duct in the vent pipe are located a sufficient distance below the top of the tank to form an expansion space 18 thereabove and to provide a nonfillable void in the tank to cause the inner ends of both the filling pipe and vent pipe to extend above the level of liquid in the tank in case the tank is inverted as in upset of the vehicle on which it is mounted.

The tank also has a fuel outlet pipe 19 including a leg portion 20 extending through the upper portion of the head 4 and which extends substantially parallel with the axis of the tank to a point adjacent the bracket 13 where it is secured thereto and terminates in a downwardly extending leg 21 having an inlet opening 22 near the bottom of the tank.

The tank thus far described substantially corresponds to the tank covered in the above mentioned patent and adequately provides the safety factors for which it is designed as long as the tank has been properly filled, that is, so that the filling duct does not contain a hydrostatic level of fluid after the tank is filled and when the outside temperature is such as not to cause expansion of the vapor in the tank.

With the head of fluid remaining in the filling duct, expansion of the fluid or the air in the vent space above the fluid causes the liquid to spout through the vent opening in the fill cap to cause the hazards as above pointed out. This head of liquid also permits filling of the tank to a point above that controlled by the position of the vent pipe 16 and this excess liquid seals the fill pipe and prevents escape of accumulated pressure in the tank due to expansion of the liquid and vapor through increase in temperature. When this occurs the vapor pressure causes the gasoline in the tank to be forced back through the filling duct resulting in sufficient spillage to be hazardous. To overcome this difficulty I provide the tank with a displacement member 23, which is of such size to displace an amount of fuel in the tank equivalent to the hydrostatic head in the filling pipe and the excess amount admitted to the tank incidental to the hydrostatic head, so that when the tank is filled the displacement member 23 is effective in receiving the excess volume of fluid so that the filling duct is substantially empty and the required expansion space is provided in the upper portion of the tank.

The member 23 is shown as formed of a sheet metal disk of circular form and having a concavo-convex wall portion 24 provided with a peripheral flange 25 extending laterally from the concave side. The member thus described is mounted on the inner surface of the tank, preferably on the inner surface of the head 4 in such a position that the upper portion thereof extends above the maximum level of liquid that can be put in the tank as shown in Fig. 1, the edge of the flange being welded to the head 4 as shown at 26. The member 23 thus cooperates with the crown in the head 4 to provide a liquid compartment 27.

The compartment 27 is of adequate capacity to accommodate the liquid which is displaced by the member 23 when the ultimate liquid level is attained in the tank. The flange 25 is provided at the uppermost point thereof with a vent opening 28 that communicates directly with the expansion space and which is of sufficient size to permit free flow of air to and from the safety compartment. This opening is also of such size that the compartment 27 is readily ventilated of explosive gases when repairs are made necessary.

Figure 2:
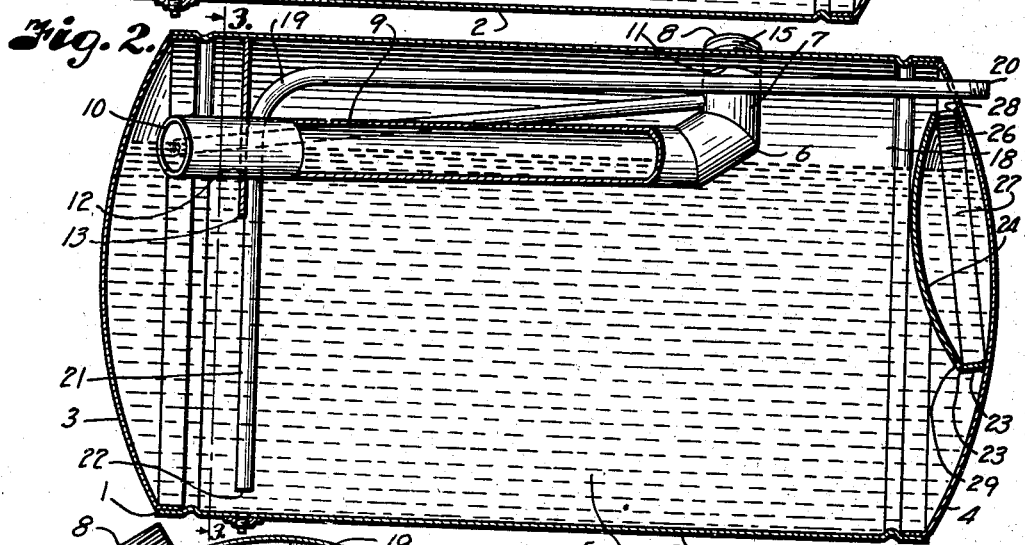
Fig. 2 is a similar section showing the subsequent fuel level as effected by my invention and which gives sufficient expansion space to take care of expansion and contraction of the fluid, and to effect substantial drainage of the filling duct into the tank.

The diametrically opposite lower portion of the member 23 is provided with a relatively small flow aperture 29 which is of such size relatively to the inflow of liquid that the rate of flow of liquid into the safety compartment is far slower than the liquid can be admitted through the filling duct. Therefore, when the tank is completely filled and a hydrostatic head of liquid is standing in the fill pipe, the safety chamber is only partially filled as shown in Fig. 1. The liquid, however, will continue to rise in the safety compartment until the level therein reaches the safe level of liquid to be carried in the tank, as shown in Fig. 2. The displacement member, therefore, does not limit the capacity of the tank as the interior compartment formed thereby ultimately receives the displaced liquid and this liquid is drained into the tank through the bottom aperture. It is thus obvious that the safety compartment is gradually drained as the tank is drained by draw-off of fuel through the pipe 19.

In filling a tank constructed and assembled as described, the cap for the filling duct is removed and the fill nozzle is placed therein so that the fuel flows through the fuel duct as in regular practice. However, when the level of liquid in the tank reaches the inlet end of the vent pipe, the inflow is retarded by reason of the pressure of the air trapped within the expansion space. The filling pipe, however, may be filled to the overflow point. The station attendant then assumes that the tank is filled and replaces the cap. The rate of flow of fuel into the tank, however, has been faster than the fuel can flow from the tank proper into the safety compartment with the result that the safety compartment is sufficiently empty to accommodate the excess liquid thereby avoiding the hazards ordinarily caused through overfilling of the fuel tank.

What I claim and desire to secure by Letters Patent is:

In a fuel tank having an exteriorly crowned end wall, a filling duct having a discharge portion extending substantially horizontally within the tank and having a lateral filling portion extending through a wall of the tank to a point above the top thereof, the outlet end of the discharge portion of said duct being located a sufficient distance below the top of the tank to form a non-fillable void within the tank when the tank is filled, a displacement member having a concavo-convex portion, and a peripheral flange secured to the crowned end of said tank and so positioned thereon as to have the upper end of said member extended into the non-fillable void, said displacement member being provided with a restricted liquid inlet below the liquid level in the tank and a vent opening connected directly with said non-fillable void, said displacement member being located with a sufficient portion thereof below the level of said non-fillable void to contain the volume of liquid required to break the liquid seal which may occur between the non-fillable void and the filling duct.

ROLLA C. COLEMAN.